United States Patent [19]
Itzler

[11] 4,081,190
[45] Mar. 28, 1978

[54] PLUMBING DEVICE

[76] Inventor: Daniel Itzler, 370 Chestnut Dr., Roslyn, N.Y. 11576

[21] Appl. No.: 668,964

[22] Filed: Mar. 22, 1976

Related U.S. Application Data

[63] Continuation-in-part of Ser. No. 551,294, Feb. 20, 1975.

[51] Int. Cl.² .............................................. F16L 27/00
[52] U.S. Cl. .................................. 285/226; 285/354; 285/423
[58] Field of Search ............... 285/237, 226, 354, 346, 285/235, 236, 240, 241, 8, 423; 138/121; 4/170, 187

[56] References Cited

U.S. PATENT DOCUMENTS

| | | | |
|---|---|---|---|
| 550,047 | 11/1895 | Kerr | 285/226 |
| 589,362 | 8/1897 | Miles | 285/354 |
| 2,184,722 | 12/1939 | McLoughlin | 4/170 UX |
| 2,385,425 | 9/1945 | Slezak | 285/346 X |
| 2,766,461 | 10/1956 | Zinkil et al. | 4/170 |
| 2,817,094 | 12/1957 | Lessley | 4/187 R X |
| 3,076,669 | 2/1963 | Schlein | 138/121 X |
| 3,313,319 | 4/1967 | Osborn et al. | 138/121 |
| 3,597,517 | 8/1971 | Smith | 138/121 X |
| 3,600,009 | 8/1971 | Shupper | 285/226 |
| 3,794,080 | 2/1974 | Huston | 138/121 |

*Primary Examiner*—Dave W. Arola
*Attorney, Agent, or Firm*—Abner Sheffer

[57] ABSTRACT

A process and device for connecting a sink tailpiece to a trap out of alignment therewith. The device has an upper section, a lower rigid section capable of being cut with a hacksaw, and a flexible pleated section.

4 Claims, 8 Drawing Figures

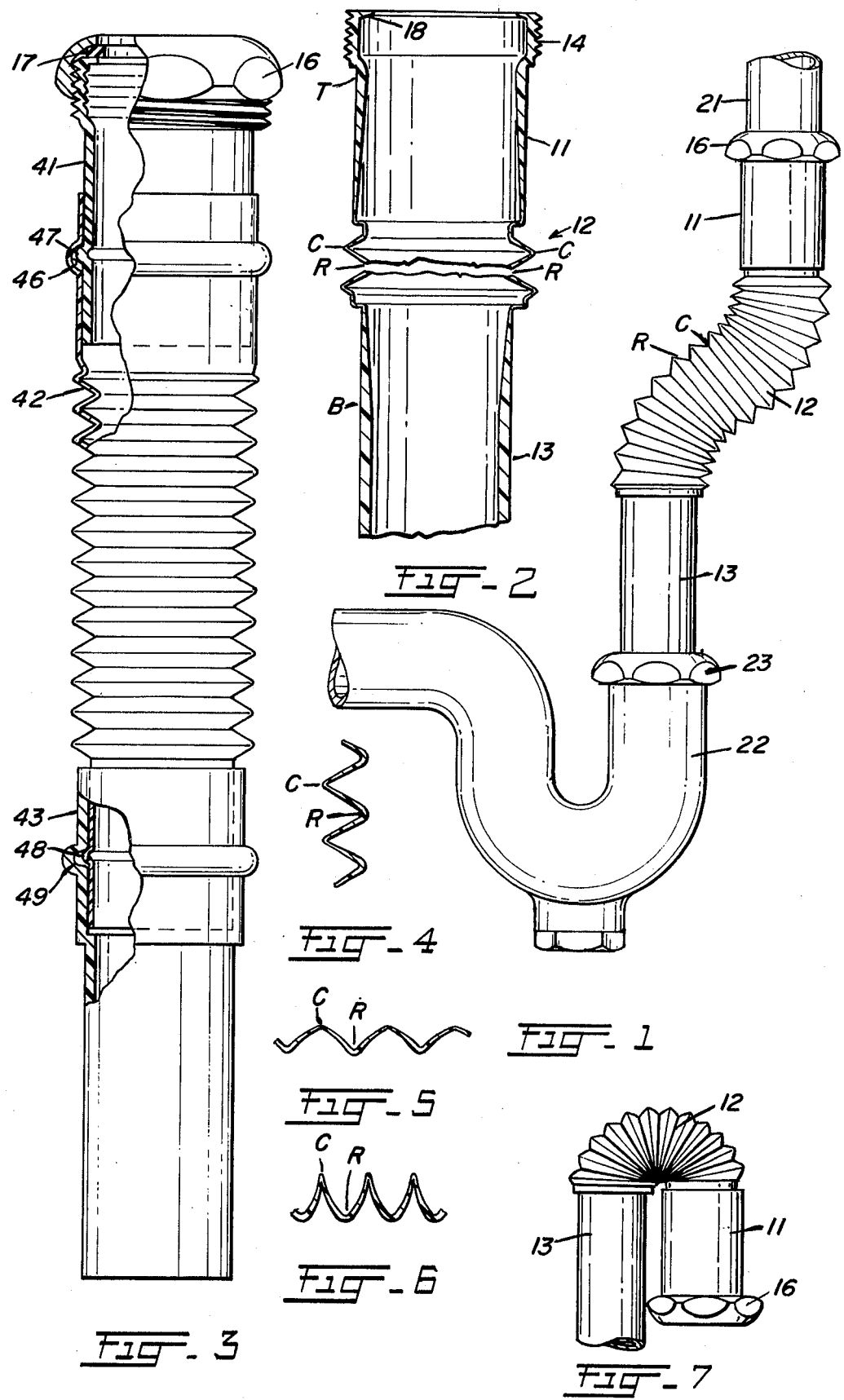

PLUMBING DEVICE

This application is a continuation-in-part of my copending application Ser. No. 551,294 filed Feb. 20, 1975.

This invention relates to the connecting of a lavatory basin or kitchen sink to an unaligned trap.

The invention is illustrated in the accompanying drawing; each Fig. is drawn generally to scale.

FIG. 1 shows a device used to connect an unaligned sink and trap.

FIG. 2 is a cross-sectional view showing portions of the device of FIG. 1.

FIG. 3 is a view, partly in cross-section, of a less desirable modification.

FIG. 4 is a cross-sectional view of a portion of the wall of the pleated section of the device of FIGS. 1 and 2 in undeformed condition.

FIG. 5 is a view like FIG. 4 but showing the shape of the expanded pleats at the outer portion of a bend.

FIG. 6 is a view like FIG. 4 but showing the shape of the contracted pleats at the inner portion of a bend.

FIG. 7 is a view of the device of FIG. 1 showing its ability to be bent around a small radius.

Figure 8:
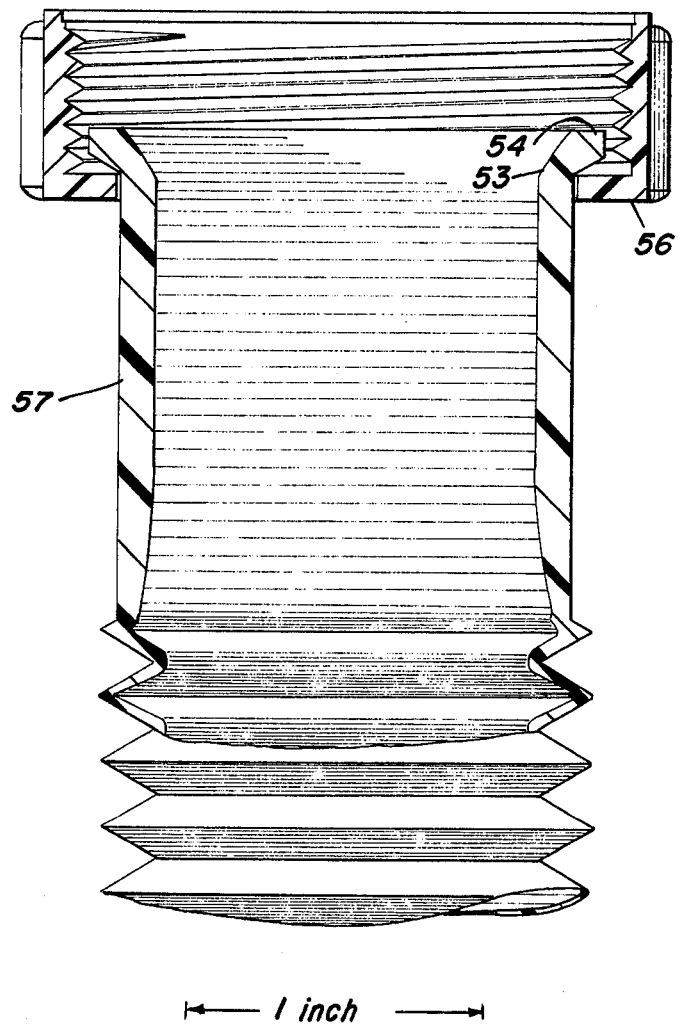
FIG. 8 is a cross-sectional view of the upper portions of another device, useful for a sink having an externally threaded tailpiece or "strainer".

The problem of connecting a lavatory basin or a sink to a trap has long been a vexing one for plumbers. In the ideal situation the plumber is able to align, substantially, the inlet opening of the trap 22 (FIG. 1) with the tailpiece 21 of the basin, so that they can be connected directly or through an intermediate rigid metal extension tube, which is a straight vertical tube fitted with a nut and washer (such as the nut 16 and washer 17 shown in FIG. 3). for gripping the tailpiece. If the vertical axes of the tailpiece and trap inlet are even slightly out of alignment (e.g. offset by ⅜ inch) the misalignment cannot be accommodated by the washer-sealed connections and there is danger of the trap leaking. In such a situation the plumber must often correct the position of the trap (the basin or sink is in fixed predetermined position). This may require breaking into the building wall from which the trap projects, under the sink or basin. Or, particularly if the misalignment is large, the plumber may use a "double offset", which is a tubular fitting having a straight central section and two end sections (each fitted with a nut and washer) at 45° to the central section; the plumber calculates where to cut through the central section, and after so cutting he telescopes one cut end into the 45° section of the other, making a swivel joint. Use of a double offset is often quite inconvenient or impossible because of spacial limitations underneath the basin or sink.

The present invention provides a process and product for avoiding all the foregoing difficulties, thereby greatly simplifying the installation of a sink or basin.

The device shown in FIGS. 1, 2 and 4–7 is of unitary blow-molded plastic tubular construction, comprising an upper section 11 a flexible pleated intermediate section 12 and a lower section 13. The upper portion of the upper section is threaded at 14 to engage a standard nut 16 over a standard flexible (e.g. rubber or nylon) washer 17 (see FIG. 3). At the top of the upper section there is an inwardly projecting lip 18 which is engaged by the bottom of that washer.

In use, the upper section receives a standard tailpiece 21 of a sink or basin. The nut and washer may be positioned on the upper section or on the tailpiece before the upper section is slipped over the tailpiece. When the nut is tightened (to compress the washer and thereby force it against the tailpiece) a substantially leak-proof joint is obtained, as is conventional in connecting a trap to such tailpiece. The internal diameter of the upper section (at its narrowest) is about the same as, or slightly larger than that of the tailpiece.

In use the lower section fits into a standard trap 22 which carries the conventional nut 23 and washer (not shown, but like 17) to make a leak-proof joint.

The flexible pleated section 12 may be eg. 2 or 3 to 5 inches in length. In the illustrated embodiment the inside diameter of the pleated section is slightly less than that of most of the upper section 11 and about equal to that of the lower section 13. The pleats are circular, extending completely around the connector. The pleated section is axially collapsible; thus, in one preferred embodiment a pleated section 2¾ inches long can be readily collapsed by hand to a length of about ¾ inch at which it cannot be further compressed since the pleats are in full face-to-face contact with each other. The pleated section is also axially stretchable; for instance, the same 2¾ inch long section may be readily handstretched by at least an inch. In that same embodiment there may be for instance, 13 equal sharp pleats in the 2¾ inch section, each pleat having a depth, in its undeformed state, of say 3/16 inch (root-to-crown distance).

As seen in FIG. 1 the pleated section 12 may be bent so as that the upper and lower sections are out of alignment (e.g. by up to an inch or two) while still remaining parallel. The lower section 13 is sufficiently rigid that it can be cut to the desired length (from its manufactured length of say about 4 to eight inches) with an ordinary hacksaw (operated with one hand while the lower section is held in the other hand) so as to be accommodated into traps situated at different vertical distances from the tailpiece. The plumber therefore need not take the time and effort to align the trap and vertical tailpiece with precision, as is now required. A misalignment of anywhere from a 1/16 inch to 2 inches can be easily taken care of.

The thickness of the walls of the tubular structure varies along its length. Thus in the illustrated embodiment, the thickness of the wall of the lower section over most of its length is about 2 mm. At this thickness the lower section is sufficiently rigid to be cut with a hacksaw, as described above, and also sufficiently rigid to resist the compression exerted by the washer of the trap when the trap nut 23 is tightened, so that there is a leak-proof joint with the trap.

The wall thickness in the pleated section is much less than the lower section wall thickness described above. In the illustrated embodiment the wall thickness at the roots R of the pleats is about 0.7 mm. while at their outer crowns C it is thinner (e.g. 0.15 mm or 0.2 mm) and the wall is therefore more flexible.

In the upper part of the lower section 13 there is a transitional portion of varying wall thickness. The thickness decreases, as one goes upward over a length of about ¾ inch, from the 2 mm thickness previously mentioned to approximately the root wall thickness mentioned above (e.g. to about 0.9 mm).

The upper section is relatively short, e.g. about 1 to 2 or 3 inches in axial length and while its wall thickness is (in the illustrated embodiment) great enough to provide some rigidity at the very top, that wall thickness decreases over most of the length of the upper section, with the wall thickness at the bottom of that upper section being close to that at the roots of the pleats (e.g. about 0.9 mm). Thus for most of its length the upper section is flexible and soft enough to be deformed easily (e.g. substantially completely collapsed) by radial squeezing with one's fingers. In contrast the lower section is much more resistant to deformation by such squeezing. In use, however, the upper section is stiffened by the presence therein of the rigid tailpiece of the sink and its softness and easy deformability do not interfere with its effectiveness.

As mentioned above, the unitary plastic structure may be formed by blow-molding, using for instance a thermoplastic polymer, such as a polyolefin, e.g. polyethylene (such as polyethylene having a specific gravity of 0.925) or polypropylene, resistant to conventional highly alkaline drain cleaners. To obtain the varying thickness, conventional molding methods may be used, e.g. the extruded parison may be manipulated to create the thinner-walled section by engaging it at points corresponding to the transition points (e.g. points T and B) and pulling it (e.g. downward from the upper transition point T) to stretch the parison between those points and thereby reduce its wall thickness between those points; then the parison is blown immediately to conform it to the corresponding mold which surrounds it. To conform to standard plumbing fixtures, the inside diameter of the upper section is substantially the same as, or slightly larger than, the 1¼ inch standard outside diameter of the tailpiece of the sink; and the outside diameter of the lower section is about 1¼ inches so as to fit into a standard trap.

In the preferred form the device is radially symmetrical; that is the transverse cross sections of the upper and lower sections are circular, and the same is preferably true of the flexible section.

When the pleated section is pulled to expand it the crowns C tend to flatten, giving the pleats a somewhat arcuate appearance as shown in FIG. 5. When it is compressed the crowns tend to become sharper as shown in FIG. 6. The pleated section generally has a marked tendency to recover to its original shape after being expanded, compressed or bent; e.g. when it is bent substantially 180° as shown in FIG. 7 and held in that position for about 20 seconds and then released, it springs back to nearly straight, or slightly bent, condition in a similar time. In use for long periods, as in the installation shown in FIG. 1, the bending stresses may be substantially relieved on aging and the material may thus become substantially permanently deformed to the installed shape.

In the device shown in FIG. 3 the upper section 41, pleated section 42 and lower section 43 are separately molded. The upper and lower sections have a relatively uniform wall thickness, sufficient to provide a stiff structure. The pleated section (preferably made by blow-molding) has thinner walls and is flexible. Its diameter at its upper end is such that it tightly receives the bottom of the upper section with a press-fit; similarly the lower end of the pleated section is of such diameter that it tightly received in the top of the lower section, with a press-fit. To insure that the parts are held firmly together without substantial relative axial movement, the upper end of the pleated section is formed with an annular trough 46 adapted to fit around an annular ridge 47 formed on the upper section. Similarly the lower end of the pleated section is formed with an annular ridge 48 adapted to fit within an annular trough 49 formed in the lower section. To insure against leaks there may be O-rings in the troughs 46 and 49 or the sections may be heat-welded together.

Another embodiment, illustrated (in cross-section) in FIG. 8, is for use with a kitchen sink having a conventional downwardly projecting male-threaded strainer element (not shown) instead of an unthreaded tailpiece. Here, the device itself has no threaded portion (14) but the top 53 of the device is formed with a flange or rim 54 adapted to abut against the bottom of the strainer element and to be held tightly there by a conventional coupling nut 56 and washer. Otherwise the construction is like that shown in FIG. 2 (or, less desirably FIG. 3) except that diameters are slightly larger so as to conform to standard plumbing fixtures used for kitchen sinks, the outside diameter of both the upper section 57 and the lower section being each 1½ inches and the outside diameter or the rim 54 being 1¾ inches. Also the walls (such as those of the upper section 57) may be relatively thick, e.g. about 3 mm as shown, to provide increased rigidity if desired.

The devices of this invention are preferably made of a heat resistant polyolefin. For best resistance to the relatively high temperatures (such as 220° F) generated by some drain cleaning compositions it is preferred to use polypropylene which is resistant to such temperatures, having a softening temperature well above 230° F.

As will be evident from the above description, applicant has provided a process for connecting a fixed basin or sink having a downwardly projecting substantially vertical outlet tube to a fixed U-shaped tubular trap having a substantially vertical inlet arm out of alignment with said outlet, said trap inlet being threaded externally and having a nut and washer for clamping in said inlet a telescopically received connecting tube, which method comprises providing a molded plastic device having an upper section adapted to be clamped to said outlet tube, a lower section to be snugly telescopically received in said trap inlet arm, and to be clamped therein by said nut and a pleated flexible section connecting said upper and lower sections, said lower section being rigid so that it can be cut by hand with a hacksaw while said lower section is held in the hand, said pleated section being capable of being bent so that said upper section and said lower section connected thereto may be maintained out of alignment but parallel, placing said lower section (after cutting it to shorten it if needed to fit the space between said outlet tube and said trap) into said trap inlet arm, clamping said lower section in said inlet arm and clamping said upper section to said outlet tube whereby said upper and lower sections are out of alignment but substantially parallel and said pleated section forms a reversely curved integral connection between said unaligned parallel upper and lower sections, said lower section being sufficiently rigid to resist the compression exerted by said washer at said trap inlet when said trap inlet nut is tightened.

To accommodate relatively large misalignments there may be used modifications of the illustrated devices, which modifications are integral, blow molded structures having at the bottom of the lower section an integral second pleated section (which can be substantially identical to the first pleated section) and then, at the bottom of the second pleated section, an integral lowermost section (which can be substantially identical to said lower section); these modified devices can be shortened by cutting through the lower section (between the first and second pleated sections) with a hacksaw to give a structure (as previously described) more suitable for use with smaller misalignments.

It is understood that the foregoing detailed description is given merely by way of illustration and that variations may be made therein without departing from the spirit of the invention. The "Abstract" given above is merely for the convenience of technical searchers and is not to be given any weight with respect to the scope of the invention.

I claim:

1. A plumbing device for connecting a fixed sink tailpiece to a trap out of alignment therewith but having an axis parallel to the axis of the sink tailpiece, said device including a tubular unitary member of plastic having an upper section to snugly receive the tailpiece, the upper section having an externally threaded end portion, and means including a nut and a washer cooperating with said threaded end portion for forming a seal to the tailpiece, said member having a cylindrical lower section to be snugly received in the trap and having a pleated flexible blow-molded section connecting said upper and lower sections, said lower section being of substantial wall thickness and being rigid so that it can be cut with a hacksaw while said lower section is held in the hand and so that it can resist compression by seal-forming means of the trap, the wall thickness of said pleated section being a minor fraction of the wall thickness of the lower section, the wall of said blow-molded pleated section comprising substantially less material per inch along its axis in its as-molded condition than the amount of material per inch along the axis of said lower section for enhancing the pliability of said pleated section, said upper section being cylindrical and having an external diameter of about 1¼ inches and a length of about 1 to 3 inches, said pleated section being about 2 to 5 inches long and being capable of being distorted so that said upper section and said lower section connected thereto may be maintained out of alignment but parallel, said lower section being about 4 to 8 inches long and being cylindrical and having an external diameter of about 1½ inches, said plastic member being of polyolefin resistant to alkaline drain cleaners.

2. A plumbing device as in claim 1 wherein said tubular unitary member of plastic is a one-piece molded part.

3. A plumbing device for connecting a male-threaded sink strainer piece to a trap out of alignment therewith but having an axis parallel to the axis of the strainer piece, said device including a tubular unitary member of plastic having an upper section including an end flange, and means including a captured nut for causing the flange to be secured and sealed to the strainer piece, said member having a lower section to be snugly received in said trap and a blow-molded pleated flexible section connecting said upper and lower sections, said lower section being generally of substantial wall thickness and being rigid so that it can be cut with a hack saw while being held in the hand and so that it can resist seal-forming means of the trap, the wall thickness of said pleated section being a minor fraction of the wall thickness of the lower section, the wall of said blow-molded pleated section comprising substantially less material per inch along its axis in its as-molded condition than the amount of material per inch along the axis of said lower section for enhancing the pliability of said pleated section, said upper section being cylindrical and having an external diameter of about 1½ inches and a length of about 1 to 3 inches, said pleated section being about 2 to 5 inches long and being capable of being distorted so that said upper section and said lower section connected thereto may be maintained out of alignment but parallel, said lower section being about 4 to 8 inches long and being cylindrical and having an external diameter of about 1½ inches, said unitary member being of polyolefin resistant to alkaline drain cleaners.

4. A plumbing device as in claim 3 wherein said tubular unitary member of plastic is a one-piece molded part.

* * * * *